United States Patent
Morisaki

(10) Patent No.: US 11,561,526 B2
(45) Date of Patent: Jan. 24, 2023

(54) CONTROL SYSTEM OF INDUSTRIAL MACHINE

(71) Applicant: FANUC CORPORATION, Yamanashi (JP)

(72) Inventor: Kazuhiko Morisaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 771 days.

(21) Appl. No.: 16/516,165

(22) Filed: Jul. 18, 2019

(65) Prior Publication Data

US 2020/0026260 A1    Jan. 23, 2020

(30) Foreign Application Priority Data

Jul. 20, 2018   (JP) .............................. JP2018-136745

(51) Int. Cl.
   G05B 19/408    (2006.01)

(52) U.S. Cl.
   CPC .................... G05B 19/4083 (2013.01); *G05B 2219/33252* (2013.01)

(58) Field of Classification Search
   CPC .................. G05B 19/4083; G05B 2219/33252
   See application file for complete search history.

(56) References Cited

U.S. PATENT DOCUMENTS

2003/0217357 A1* 11/2003 Parry ........................ G06F 8/65
                                                        719/310
2009/0125122 A1*  5/2009 Cook .................... G05B 19/058
                                                        700/9

(Continued)

FOREIGN PATENT DOCUMENTS

JP    H06-019512 A    1/1994
JP    H07-261818 A    10/1995

(Continued)

OTHER PUBLICATIONS

An Office Action; "Notice of Reasons for Refusal," mailed by the Japanese Patent Office dated Sep. 29, 2020, which corresponds to Japanese Patent Application No. 2018-136745 and is related to U.S. Appl. No. 16/516,165 with English language translation.

*Primary Examiner* — Richard L Bowen
(74) *Attorney, Agent, or Firm* — Studebaker & Brackett PC

(57) ABSTRACT

An object of the present invention is to provide a control system of an industrial machine that can efficiently and effectively match and equalize the content information of various data between devices of the industrial machine. The invention is a control system of an industrial machine for matching data in the present device with data in one or more other devices, wherein the control system comprises a changed data identification list including: the regions of a type data storage unit serving as the superordinate class of type data; the regions of a subdivision data type storage unit serving as a subordinate class; and an identifier storage unit indicating identifiers which, when data in each of the regions is changed, identify the change of the data, the present device comprises: a changed data identification list storage unit storing the changed data identification list; a present-device-side data storage unit storing various data; and an updated data processing unit, and the other device comprises: an other-device-side data storage unit storing various data; and an operation execution unit using the various data to perform a desired operation.

5 Claims, 10 Drawing Sheets

(56) References Cited

U.S. PATENT DOCUMENTS

2014/0130033 A1\* 5/2014 Alls .................... G06F 8/65
　　　　　　　　　　　　　　　　　　　　　　717/172
2021/0141628 A1\* 5/2021 Garrabrant ............ G06F 21/572

FOREIGN PATENT DOCUMENTS

| JP | H07-334224 A | 12/1995 |
|---|---|---|
| JP | H08-063211 A | 3/1996 |
| JP | 2009-134568 A | 6/2009 |
| JP | 2018-085062 A | 5/2018 |

\* cited by examiner

FIG. 1

| FLAGS FOR EACH DATA TYPE | | FLAGS FOR EACH CHANGED PART | |
|---|---|---|---|
| OPTION | 0 | ALL | 0 |
| PARAMETER | 1 | No.0000 ~ 0999 | 0 |
| | | No.1000 ~ 1999 | 1 |
| | | : | |
| : | | | |
| MACRO VARIABLE | 1 | #001 ~ 499 | 1 |
| | | #500 ~ 999 | 1 |
| | | : | |
| : | | | |

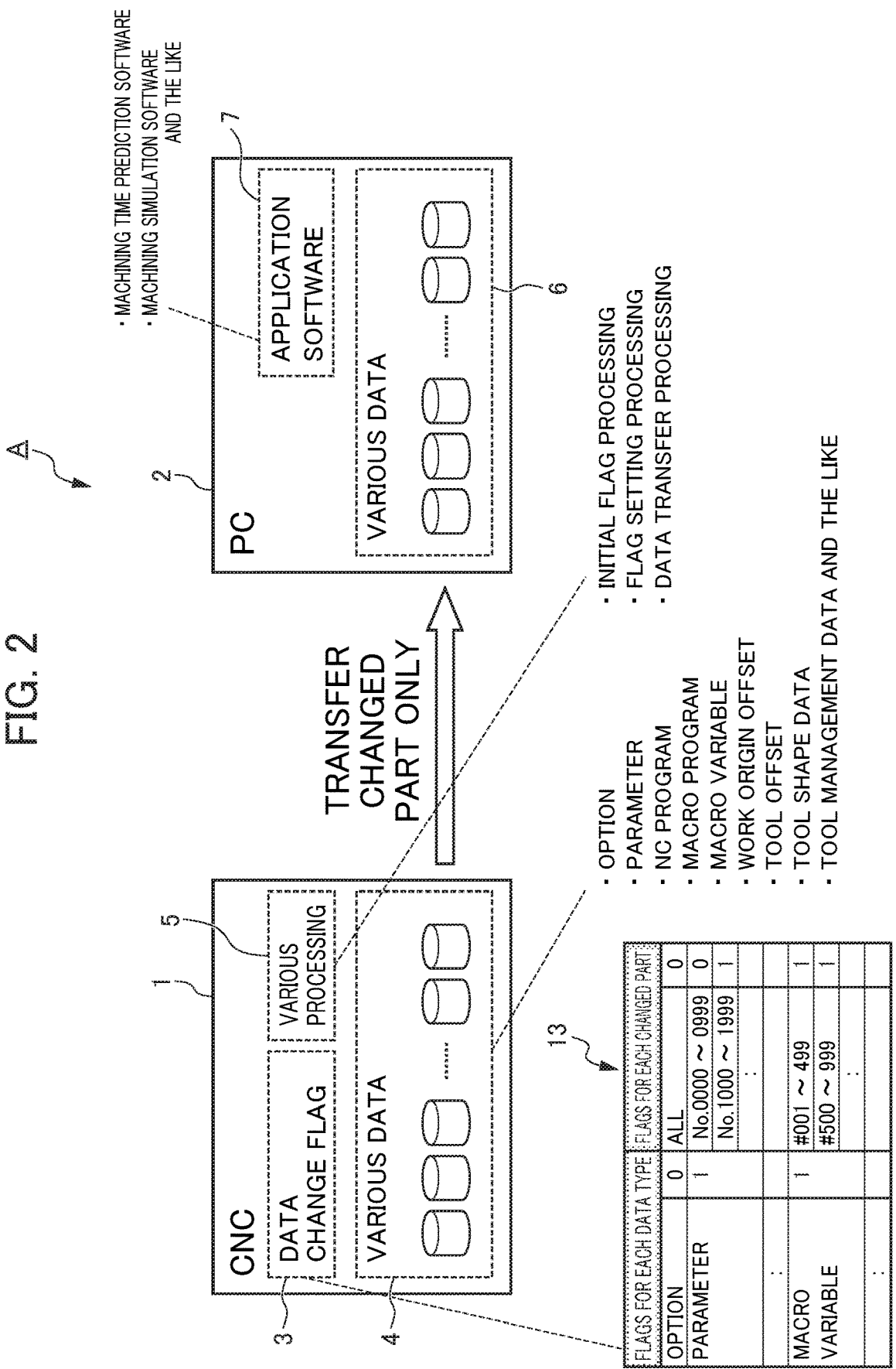

FIG. 6

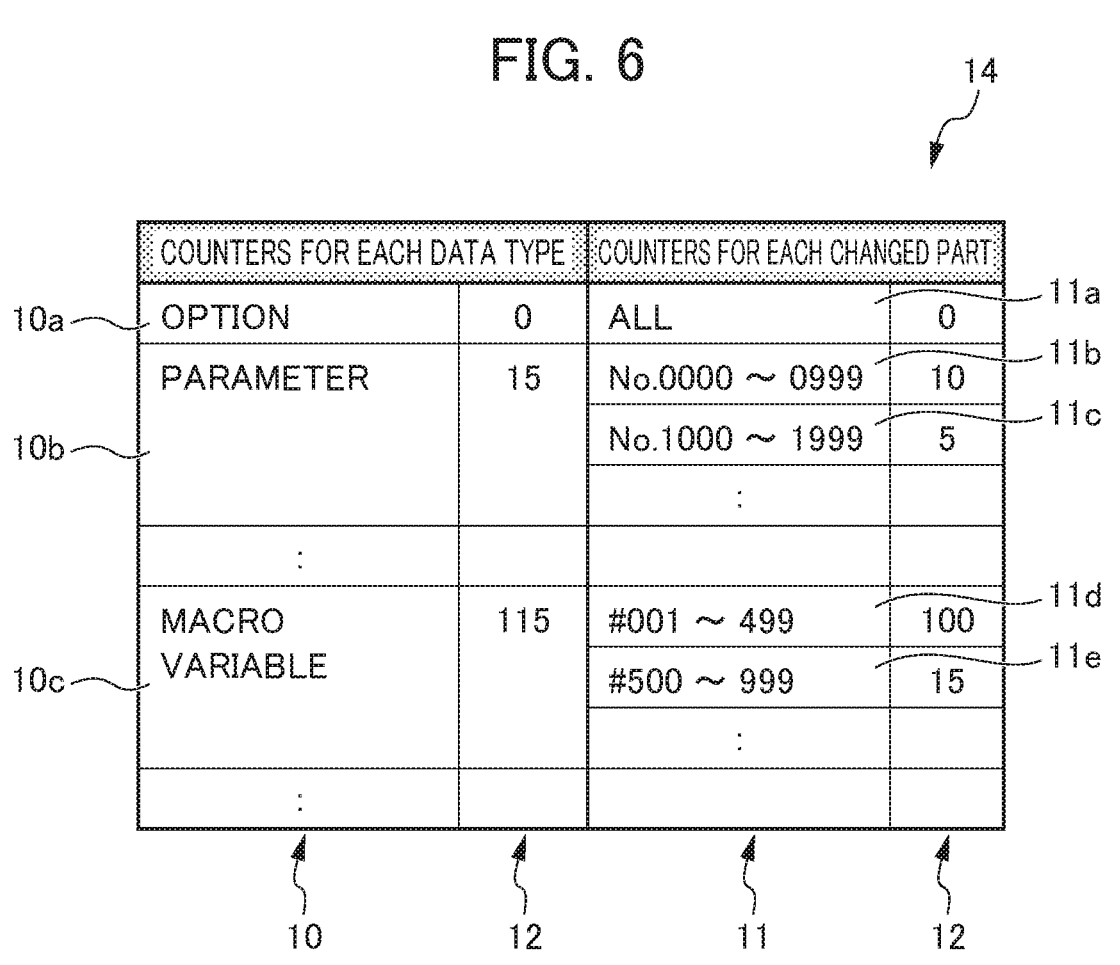

| COUNTERS FOR EACH DATA TYPE | | COUNTERS FOR EACH CHANGED PART | |
|---|---|---|---|
| OPTION | 0 | ALL | 0 |
| PARAMETER | 15 | No.0000 ~ 0999 | 10 |
| | | No.1000 ~ 1999 | 5 |
| | | : | |
| : | | | |
| MACRO VARIABLE | 115 | #001 ~ 499 | 100 |
| | | #500 ~ 999 | 15 |
| | | : | |
| : | | | |

FIG. 8A

| COUNTERS FOR EACH DATA TYPE | | COUNTERS FOR EACH CHANGED PART | |
|---|---|---|---|
| OPTION | 0 | ALL | 0 |
| PARAMETER | 15 | No.0000 ~ 0999 | 10 |
| | | No.1000 ~ 1999 | 5 |
| | | ⋮ | |
| ⋮ | | | |
| MACRO VARIABLE | 115 | #001 ~ 499 | 100 |
| | | #500 ~ 999 | 15 |
| | | ⋮ | |
| ⋮ | | | |

FIG. 8B

| COUNTERS FOR EACH DATA TYPE | | COUNTERS FOR EACH CHANGED PART | |
|---|---|---|---|
| OPTION | 0 | ALL | 0 |
| PARAMETER | 18 | No.0000 ~ 0999 | 10 |
| | | No.1000 ~ 1999 | 8 |
| | | ⋮ | |
| ⋮ | | | |
| MACRO VARIABLE | 140 | #001 ~ 499 | 120 |
| | | #500 ~ 999 | 20 |
| | | ⋮ | |
| ⋮ | | | |

CONTROL SYSTEM OF INDUSTRIAL MACHINE

This application is based on and claims the benefit of priority from Japanese Patent Application No. 2018-136745, filed on 20 Jul. 2018, the content of which is incorporated herein by reference.

BACKGROUND OF THE INVENTION

Field of the Invention

The present invention relates to a control system and a control method of an industrial machine such as a machine tool, a robot, a PLC, a transport machine, a measuring device, a testing device, a press machine, a press-fitting device, a printing machine, a die casting machine, an injection-molding machine, a food machine, a packaging machine, a welding machine, a washing machine, a coating machine, an assembly device, a mounter, a woodworking machine, a sealing device or a cutting machine, and more particularly, relates to a control system and a method for matching changed data between devices, such as between a CNC on a machine tool side and a PC or between a plurality of CNCs.

Related Art

As is already known, in the field of machine work, by numerically controlling the amount of movement of a tool, the speed of movement thereof, and the like with a computer applying a CNC (Computerized Numerical Control) technology thereto, the repetition of the same machining procedure, the machining of a complicated shape, and the like are highly automated. Moreover, the data in a PC (Personal Computer) produced with a CAD or a CAM is imported and reflected to the machine tool side such as an NC lathe or a machining center to perform consistent automation from design to manufacturing (see, for example, Patent Document 1).

Patent Document 1: Japanese Unexamined Patent Application, Publication No. H07-261818

SUMMARY OF THE INVENTION

On the other hand, for example, when predicting the machining time of a CNC or performing machining simulation on a PC, it is required to transfer various data of the CNC such as options, parameters, NC programs, macro programs, macro variables, work origin offsets, tool offsets, tool shape data and tool management data to the PC side and equalize/match the content information in advance.

Further, when a plurality of machine tools is provided, there are cases where it is desired to equalize the contents of various data between the machine tools.

Moreover, when equalizing the contents of data of a device on the PC side with a device on the CNC side or equalizing data of devices on the sides of a plurality of machine tools, generally, all types of data (such as options, parameters, NC programs, macro programs, macro variables, work origin offsets, tool offsets, tool shape data and tool management data) are transferred, or only the type of data which was changed is transferred based on selection by an operator.

However, the regions of each type of data are, for example, divided further into a plurality of regions, and in such a case, it is impossible to find out (rapidly find out) in which type region, or further, which divided region, or even further, which part of the enormous amount of data a change was made.

Hence, when it is desired to equalize the contents of various data of a CNC with a PC or between CNCs, if all the types of data are to be transferred, the size of data is so large that it takes time in the order of minutes, thereby consuming much time and effort for the processing. Moreover, since the flow of the operation, that is, the operational flow is interrupted, this causes operability and hence productivity to decline.

Here, although it is possible to reduce the processing time by making an operator select and transfer only the type of data which was changed, since the operator himself/herself needs to remember or visually check which type of data was changed, the increase in the burden during operation becomes problematic.

Furthermore, even when only the type of data which was changed is selected, since it is impossible to exclusively transfer the changed part within the data, it takes several tens of seconds depending on the type, resulting in an increase in the processing time.

It should be noted that, since the invention disclosed in Patent Document 1 is one that transfers drawing data is designed/changed on the PC side to an NC machine tool, it is impossible to reflect the data on the NC machine tool side to the PC side, nor the data in a plurality of machine tools can be matched. Hence, it is still impossible to solve the inconveniences described above.

In view of the foregoing conditions, an object of the present invention is to provide a control system of an industrial machine that can efficiently and effectively match and equalize the content information of various data between devices of the industrial machine and thus can reduce processing time, enhance operability and productivity, and reduce the burden during operation as compared with conventional systems.

The present inventor has found a method that enables automatic distinguishing of the type of data as well as the part that was changed when, for example, it is desired to match and equalize the content information of various data of a CNC with a PC or between CNCs, thus achieving the present invention. More specifically, the present invention provides the followings.

(1) The present invention is a control system of an industrial machine for matching data in the present device with data in one or more other devices, wherein the control system comprises a changed data identification list including: the regions of a type data storage unit serving as the superordinate class of type data; the regions of a subdivision data type storage unit serving as a subordinate class of the regions of the type data storage unit; and an identifier storage unit indicating identifiers which, among the regions of the type data storage unit and the subdivision data type storage unit, correspond to at least each region of the subdivision data type storage unit and, when data in the respective regions are changed, identify said changes, the present device comprises: a changed data identification list storage unit storing the changed data identification list; a present-device-side data storage unit storing various data; and an updated data processing unit, and the other device comprises: an other-device-side data storage unit storing various data; and an operation execution unit using the various data to perform a desired operation, the control system configured such that the updated data processing unit uses the identifiers in the changed data identification list so as to check whether or not data was changed in the region, transfers only the changed data in the region to the other devices, and matches the data in the present device with the data in the other devices.

(2) According to the present invention, in the control system of the industrial machine described in (1), in the case of a one-to-one connection environment between the one present device and the one other device, a flag that identifies whether the data is in either an initial state or a changed state may be used as the identifier.

(3) According to the present invention, in the control system of the industrial machine described in (1), in the case of a one-to-one or one-to-multiple connection environment between the one present device and the one other device or the other devices, a counter, which is incremented or decremented each time the data is changed and identifies the initial state of the data as well as the changed state in the number of changes in the data, may be used as the identifier.

(4) According to the present invention, the control system of the industrial machine described in (2) may be configured such that the flag is reset to the initial state when the data in the region which was changed is transferred to the other device.

(5) According to the present invention, in the control system of the industrial machine described in any one of (1) to (4), the changed data identification list may be configured such that the identifier storage unit is provided for each region indicating the division information of the type data storage unit serving as the superordinate class of the type data, and that the identifier storage unit is provided for each region indicating the division information of the subdivision data type storage unit serving as the subordinate class.

In the inventions of (1) to (5), when it is desired to equalize the content information of various data between devices of an industrial machine, it is possible to easily and automatically distinguish the data region that was changed, such as the changed data type, with identifiers, and by transferring the changed data region between the devices, it becomes possible to efficiently match the content information between devices.

According to the present invention, it is possible to significantly reduce the processing time for data updating (as well as processing time for extracting changed data and the like) as compared with conventional ones such that operability can be enhanced.

BRIEF DESCRIPTION OF THE DRAWINGS

FIG. 1 is a diagram showing a "changed data identification list" used in a control system of an industrial machine as well as a method of controlling the industrial machine according to a first embodiment of the present invention;

FIG. 2 is a diagram showing the control system of the industrial machine according to the first embodiment of the present invention;

FIGS. 3A and 3B are diagrams showing the "changed data identification list" used in the control system of the industrial machine and the method of controlling the industrial machine according to the first embodiment of the present invention, wherein FIG. 3A is a diagram showing an initial state where flags are reset to "0" and FIG. 3B is a diagram showing a state where flags in the parts whose data was changed are set to "1";

FIGS. 4A and 4B are diagrams showing the method of controlling the industrial machine according to the first embodiment of the present invention, wherein FIG. 4A is a flowchart showing the resetting of flags to "0" and FIG. 4B is a flowchart showing the setting of flags in the parts whose data is changed to "1";

FIG. 6 is a diagram showing a "changed data identification list" used in a control system of an industrial machine and a method of controlling the industrial machine according to a second embodiment of the present invention;

FIGS. 8A and 8B are diagrams showing the "changed data identification list" which is used in the control system of the industrial machine and the method of controlling the industrial machine according to the second embodiment of the present invention, wherein FIG. 8A is a diagram showing a state of the counters before updating and FIG. 8B is a diagram showing a current state where the counters in parts whose data was changed are updated (incremented);

FIGS. 9A and 9B are diagrams showing the method of controlling the industrial machine according to the second embodiment of the present invention, wherein FIG. 9A is a flowchart showing the resetting of the counters to "0" and FIG. 9B is a flowchart showing the updating (incrementing) of the flags in the parts whose data was changed.

DETAILED DESCRIPTION OF THE INVENTION

Figure 3A:
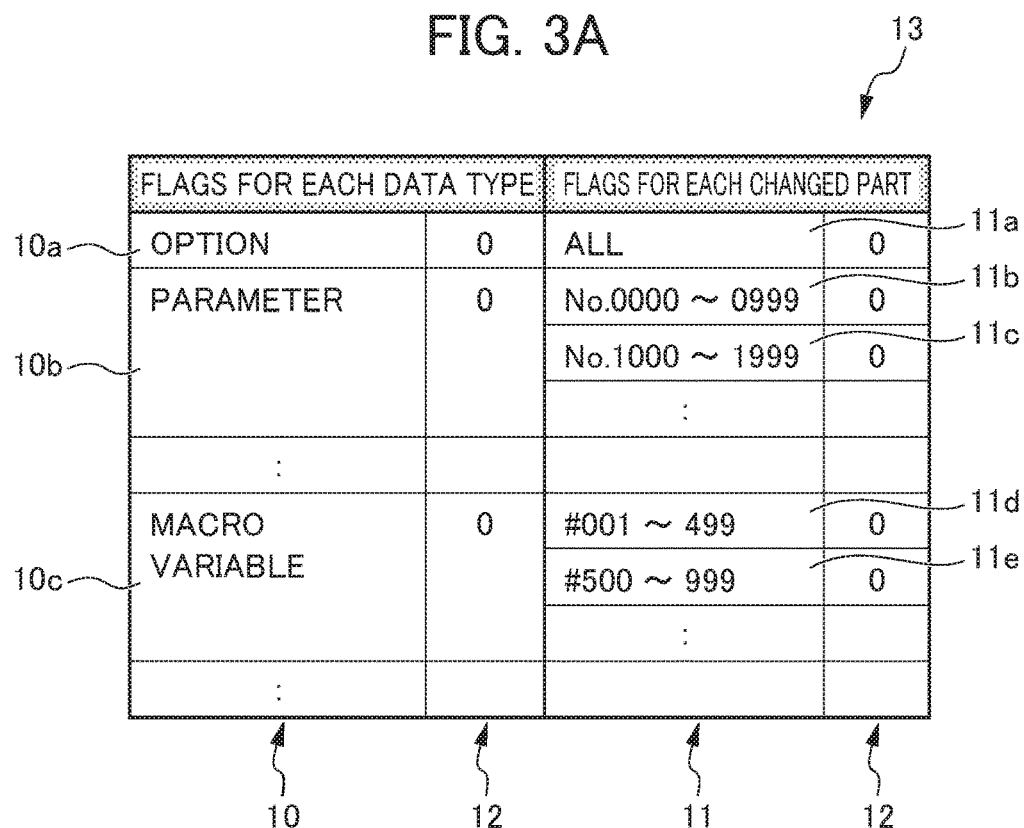

A control system of an industrial machine according to a first embodiment of the present invention will be described hereinafter with reference to FIGS. 1 to 5.

Here, for the present embodiment, description will be given using a case where changed data is transferred between one CNC on the machine tool side and one PC, that is, between one device and another device so as to be matched and equalized, as an example. It should be noted that, although the industrial machine according to the present invention is assumed to be a machine tool (the present device being the machine tool and the other device being the PC) in the description of the present embodiment, needless to say, the present invention can be applied to other industrial machines as well.

A control system A of an industrial machine according to the present embodiment is a control system and method of a "flag system" type which, as shown in FIGS. 1 and 2, uses a "changed data identification list" 13 within a CNC 1, the list 13 comprising: the regions of a superordinate class 10 (the regions (division information) 10a, 10b, 10c, . . . of a type data storage unit 10) related to the types of data such as options, parameters, NC programs, macro programs, macro variables, work origin offsets, tool offsets, tool shape data and tool management data; and the regions of data types of a subordinate class 11 (the regions (division information) 11a, 11b, 11c, 11d, 11e, . . . of a subdivision data type storage unit 11) obtained such as by further subdividing the regions of data 10a, 10b, 10c, . . . of each type of the superordinate class 10, while also comprising: a region (identifier storage unit 12) storing flags (identifiers) which correspond to each region of data of the superordinate class 10 and regions of data of the subordinate class 11 and, when change occurs in the respective regions, identify said changes.

In other words, in the control system A of the industrial machine according to the present embodiment, the "changed data identification list" 13 is configured such that the types and data are hierarchized as the regions of the superordinate class 10 as well as the regions of the subordinate class 11, and an identifier indicating the presence/absence of a change is provided to each and all of the type and data in each class. It should be noted that the "changed data identification list" 13 may also be configured such that the regions of the subordinate class 11 are further subdivided (multi-hierarchized) so as to comprise a plurality of subordinate classes 11.

Here, the "flag" in the present invention refers to an identifier which indicates either of two states of data, namely, an initial state and a changed state, thereby determining these states. In the description of the present embodiment, it is assumed that the "flag" of the identifier indicates the initial state (a state where no change is made) of data as "0", while indicating the changed state (state where a change is made) of data as "1". It should be noted that, as long as the "flag" of the identifier can indicate two states identifiably, it may be "0 and x", "first and second", or the like, and no particular limitation is required.

Here, as shown in FIG. 2, in the CNC 1 of the machine tool serving as the present device, the control system A of the industrial machine according to the present embodiment comprises: a changed data identification list storage unit 3 storing the "changed data identification list" 13; a various data storage unit (present-device-side data storage unit) 4 storing various data; and an updated data processing unit 5 for performing initial flag processing, flag setting processing, flag checking processing, data transfer processing, and the like.

Furthermore, a PC 2 for performing desired operations related to the machine tool such as machining time prediction or machining simulation by the machine tool comprises: a various data storage unit (other-device-side data storage unit) 6 storing various data; and an operation execution unit 7 for performing desired operations using various data and application programs such as machining time prediction software and machining simulation software.

Figure 4A:
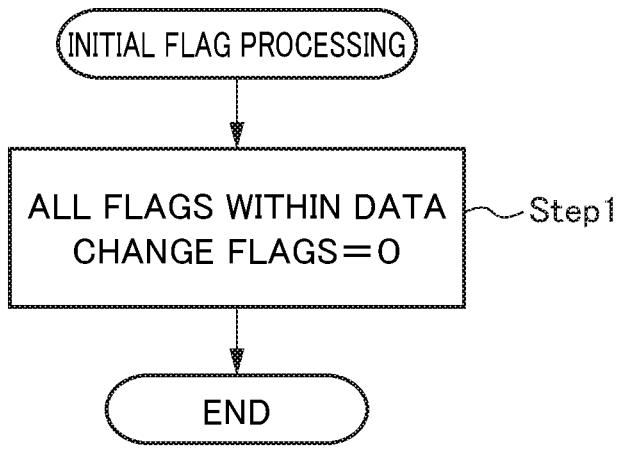

When controlling the CNC 1 of the machine tool and the PC 2 using the control system A of the industrial machine of the above configuration according to the present embodiment, as shown in FIGS. 3A and 4A, first of all, upon turning on the power of the CNC/machine tool, all the flags for each class in the "changed data identification list" 13, that is, the flags for each data type in the regions of the superordinate class 10 (the flags for each data type, the identifier storage unit 12 of the type data storage unit 10) as well as the flags in the regions of each data type of the subordinate class 11 corresponding to the regions of the superordinate class 10 (the flags for each changed part, the identifier storage unit 12 of the subdivision data type storage unit 11), are cleared to the "initial value=0" (Step 1).

Figure 3B:
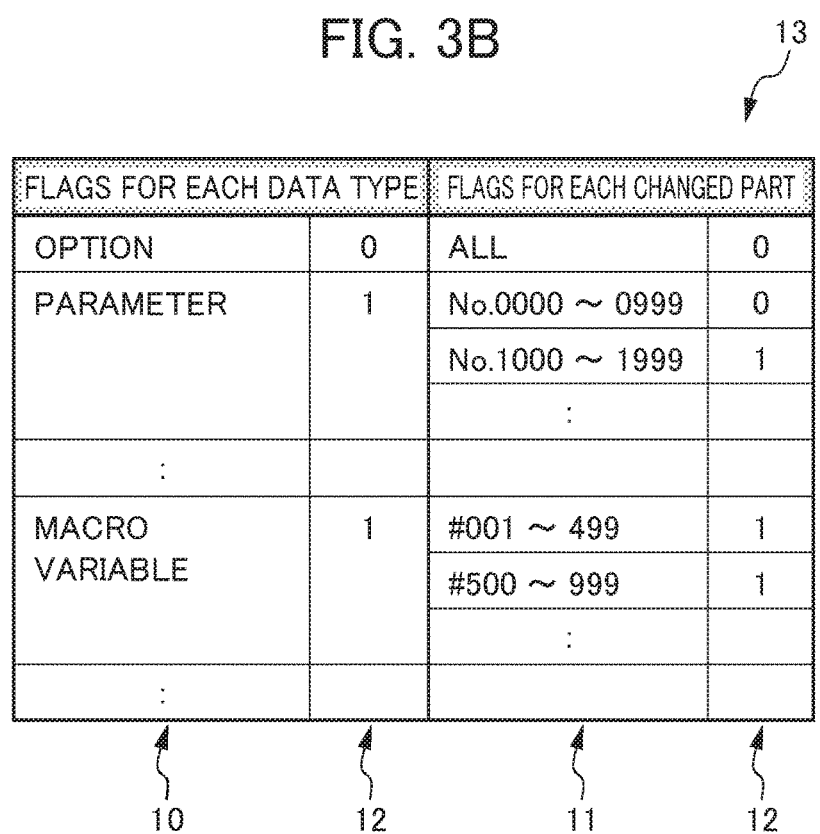
Figure 4B:
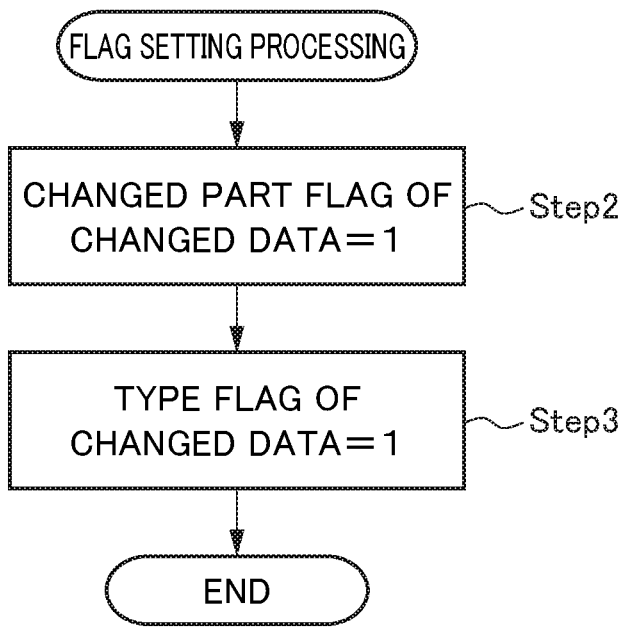

As shown in FIGS. 3B and 4B, when the data of the CNC 1 is changed, the "flags for each changed part (the identifier storage unit 12 of the subdivision data type storage unit 11)" to which the changed data corresponds, as well as the flags of the "flags for each data type (the identifier storage unit 12 of the type data storage unit 10)" to which the changed data corresponds, are set to "1" (Step 2, Step 3).

Figure 5:
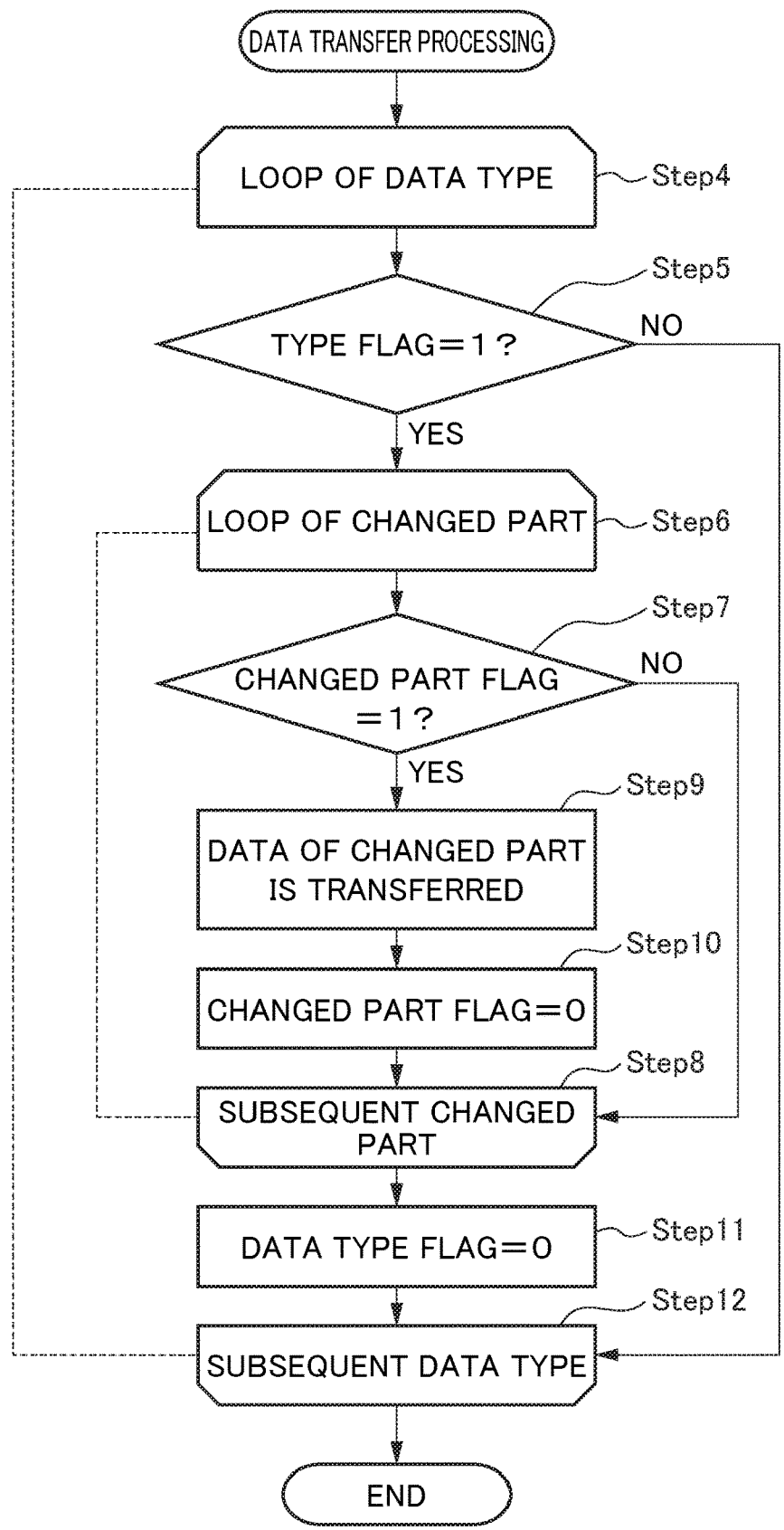
FIG. 5 is a flowchart showing the method of controlling the industrial machine according to the first embodiment of the present invention.

Then, when matching/equalizing the changed data on the CNC side with the data on the PC side, as shown in FIGS. 2 and 5, the "changed data identification list" 13 is read out from the changed data identification list storage unit 3 of the CNC 1, and it is checked whether or not the "flags for each data type (the flags of the identifier storage unit 12 for each type data storage unit 10) are set to "1" for each data type of the regions 10a, 10b, 10c, . . . of the superordinate class 10.

If the flags for each data type is set to "0" (not set to "1"), it is checked whether or not the flags for each data type is set to "1" for the subsequent data type (Step 4, Step 5).

If the flags for each data type is set to "1", it is checked whether or not the flags for each changed part of the regions 11a, 11b, 11c, 11d, 11e, . . . of the subordinate class 11 (the flags of the identifier storage unit 12 for each subdivision data type storage unit 11) are set to "1" (Step 6, Step 7).

If the flags for each changed part is set to "0" (not set to "1"), it is checked whether or not the flag of the subsequent changed part in the same region (the identifier storage unit 12) is set to "1" (Step 8).

If the flags for each changed part is set to "1", the changed data of the changed part (the part corresponding to the subdivision data type storage unit 11) in which the flags for each changed part is set to "1" is transferred to the various data storage unit 6 on the PC 2 side (Step 9). Also, after transferring the data of the part (region) in which the flag is set to "1", the flag of said part is reset to "0" indicating the initial state (Step 10). Thereafter, checking of the flags for each of the other changed parts is restarted (Step 8).

Then, the flag of the types wherein the data is transferred is reset to "0" (Step 11), and the checking operation of the flags and data transfer in the same manner as described above are performed for the subsequent data type (Step 12).

By performing the operation described above for all the data types, the CNC 1 side and the PC 2 side will have the same changed data, with the result that it becomes possible to match the data between the devices.

For example, when the one PC 2 is connected to the CNC 1 as in the present embodiment, the type of data which was changed as well as the changed part are distinguished by the "flag system" described above, and the data (region) of the changed part is transferred to the PC 2. In this way, in the PC 2, the changed data can be reflected so as to perform machining time prediction, machining simulation and the like using application softwares.

Hence, in the control system A of the industrial machine according to the present embodiment, it is possible to easily distinguish the data type that was changed as well as the changed part by simply checking the flags.

Hence, in the control system A of the industrial machine according to the present embodiment, when, for example, it is desired to match/equalize the content information of various data between a CNC and a PC or between CNCs, the data type which was changed can be automatically distinguished, and the processing time can be reduced by transferring only the data region of said type. Accordingly, operability and hence productivity can be enhanced.

Also, since the data type which was changed can be presented/extracted, it becomes unnecessary to rely on memory or visual check when the operator selects the type of data to be transferred, with the result that the burden during the operation can be reduced.

Furthermore, since the changed part within the data can be automatically distinguished, it is possible to reduce the processing time for data transfer.

Although the first embodiment of the control system of the industrial machine according to the present invention has been described so far, the present invention is not limited to the first embodiment described above, and modifications can be made as necessary as long as they do not depart from the spirit of the invention.

Hereinafter, a control system of an industrial machine according to a second embodiment of the present invention will be described with reference to FIGS. 6 to 10.

Here, in the present embodiment, a description will be given using a case where changed data is transferred between one CNC and two PCs, that is, between one device and two (plural) devices, so as to be matched and equalized, as an example. It should be noted that, although the industrial machine according to the present invention is assumed to be a machine tool (the present device being the machine tool and the other devices being the PCs) in the description of the present embodiment, needless to say, the present invention can be applied to other industrial machines as well. In the present embodiment, configurations which are the same as those of the first embodiment are identified with the same reference numerals, and the detailed description thereof will be omitted.

Figure 7:
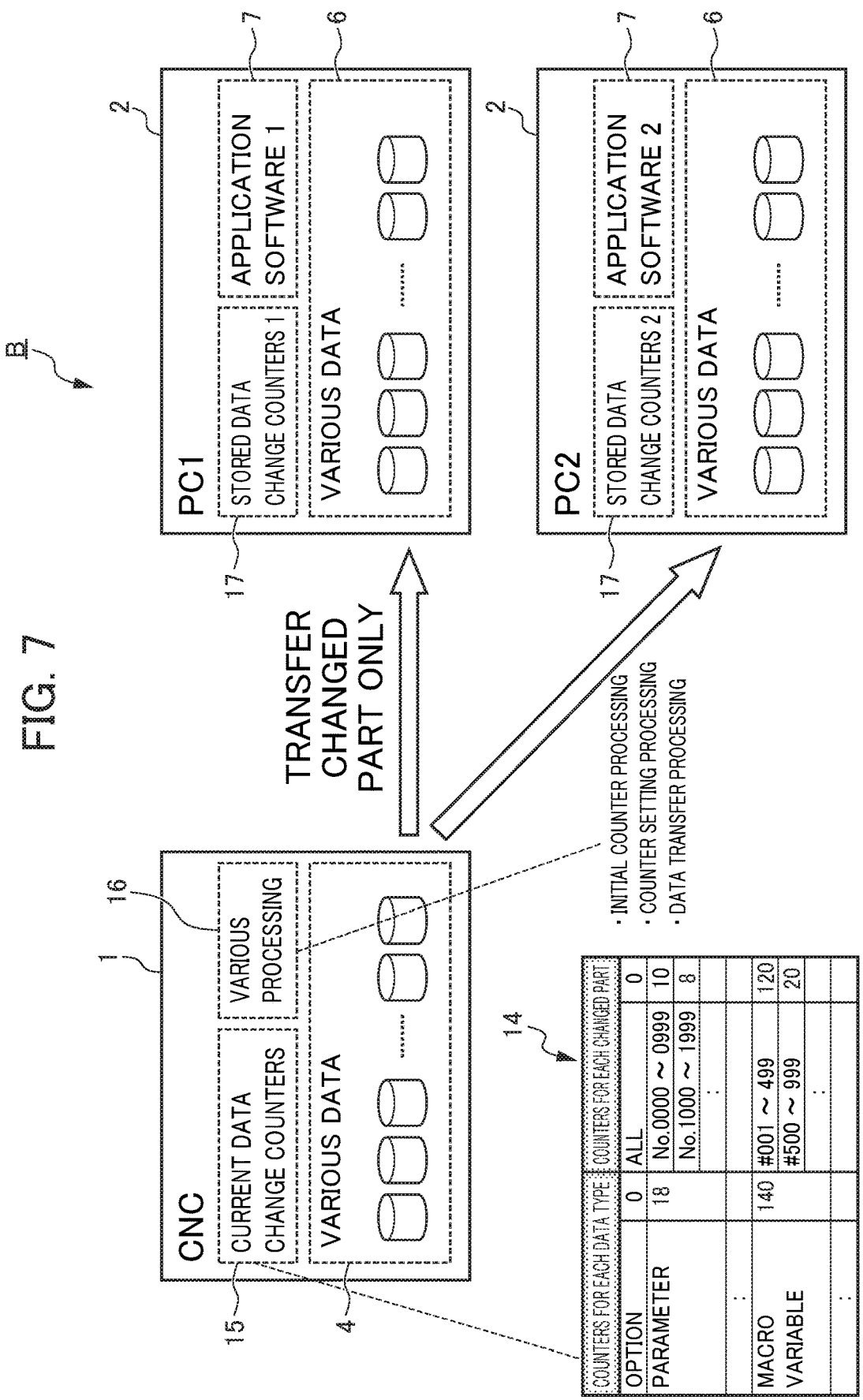
FIG. 7 is a diagram showing the control system of the industrial machine according to the second embodiment of the present invention.

A control system B of an industrial machine according to the present embodiment is a control system and method of a "counter system" type which, as shown in FIGS. 6 and 7, uses a "changed data identification list" 14 within a CNC 1, the list 14 comprising: the regions of a superordinate class 10 (the regions 10a, 10b, 10c, . . . of a type data storage unit 10) related to types of data; the regions of data types of a subordinate class 11 (the regions 11a, 11b, 11c, 11d, 11e, . . . of a subdivision data type storage unit 11) obtained such as by further subdividing each type data region of the superordinate class 10; and a region (identifier storage unit 12) storing counters (identifiers) which correspond to each region of data of the superordinate class 10 and regions of data of the subordinate class 11 and, when change occurs in the respective regions, identify said changes.

In other words, in the control system B of the industrial machine according to the present embodiment, like in the first embodiment, the "changed data identification list" 14 is configured such that the types and data are hierarchized as the regions of the superordinate class 10 as well as the regions of the subordinate class 11, and an identifier indicating the presence/absence of a change is provided to each and all of the type and data in each class. It should be noted that, as in the first embodiment, the "changed data identification list" 14 may also be configured such that the regions of the subordinate class 11 are further subdivided (multi-hierarchized) so as to comprise a plurality of subordinate class regions.

Here, as shown in FIG. 7, in the CNC 1 of the machine tool serving as the present device, the control system B of the industrial machine according to the present embodiment comprises: a changed data identification list storage unit 15 storing the "changed data identification list" 14 (storing current counters); a various data storage unit (present-device-side data storage unit) 4 storing various data; and an updated data processing unit 16 for performing initial counter processing, counter setting processing, counter checking processing, data transfer processing, and the like.

Furthermore, in the control system B of the industrial machine according to the present embodiment, each of a plurality of PCs 2 for performing desired operations comprises: a various data storage unit (other-device-side data storage unit) 6 storing various data; an operation execution unit 7 for performing desired operations using various data and application programs such as machining time prediction software and machining simulation software; and a pre-update counter storage unit 17 storing the "changed data identification list" 14 before being updated (storing the counters before being updated).

Figure 9A:
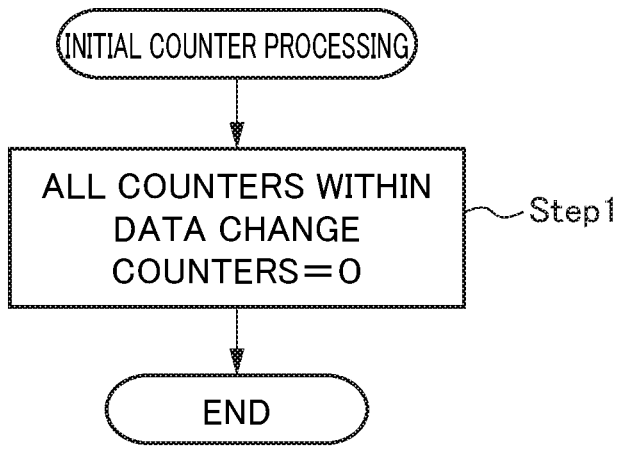

When controlling the CNC 1 of the machine tool and the PCs 2 using the control system B of the industrial machine of the above configuration according to the present embodiment, as shown in FIG. 9A, first of all, upon turning on the power of the CNC/machine tool, all the counters for each class in the "changed data identification list" 14, that is, the counters for each data type in the regions of the superordinate class 10 (the counters for each data type, the identifier storage unit 12 of the type data storage unit 10) as well as the counters in the regions of each data type of the subordinate class 11 (the counters for each changed part, the identifier storage unit 12 of the subdivision data type storage unit 11), are cleared to the "initial value=0" (Step 1).

Figure 9B:
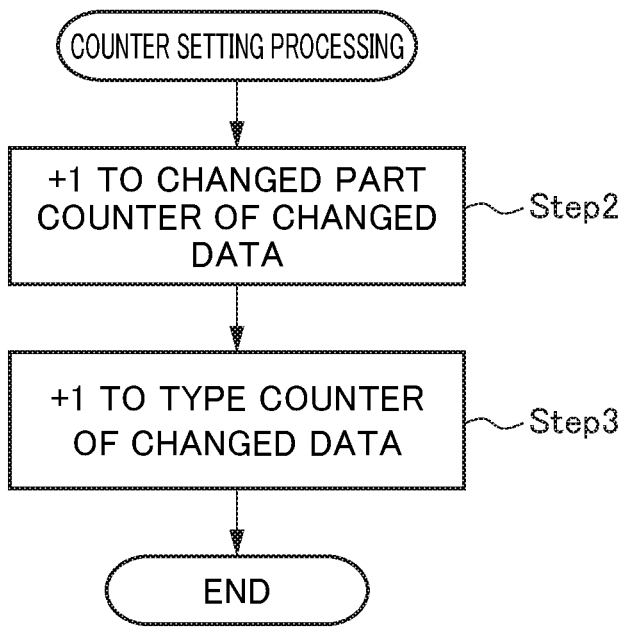

As shown in FIGS. 8B and 9B, when the data of the CNC 1 is changed, the "counters for each changed part (the identifier storage unit 12 of the subdivision data type storage unit 11)" to which the changed data corresponds, as well as the counters of the "counters for each data type (the identifier storage unit 12 of the type data storage unit 10)" to which the changed data corresponds are incremented by +1 (increment: to increase the number), thereby indicating/recording the number of changes (Step 2, Step 3). It should be noted that, as for the counters, the number thereof may be set in advance and may be decremented by −1 (decrement: to decrease the number) when the data is changed, thereby indicating the number of changes.

Figure 10:
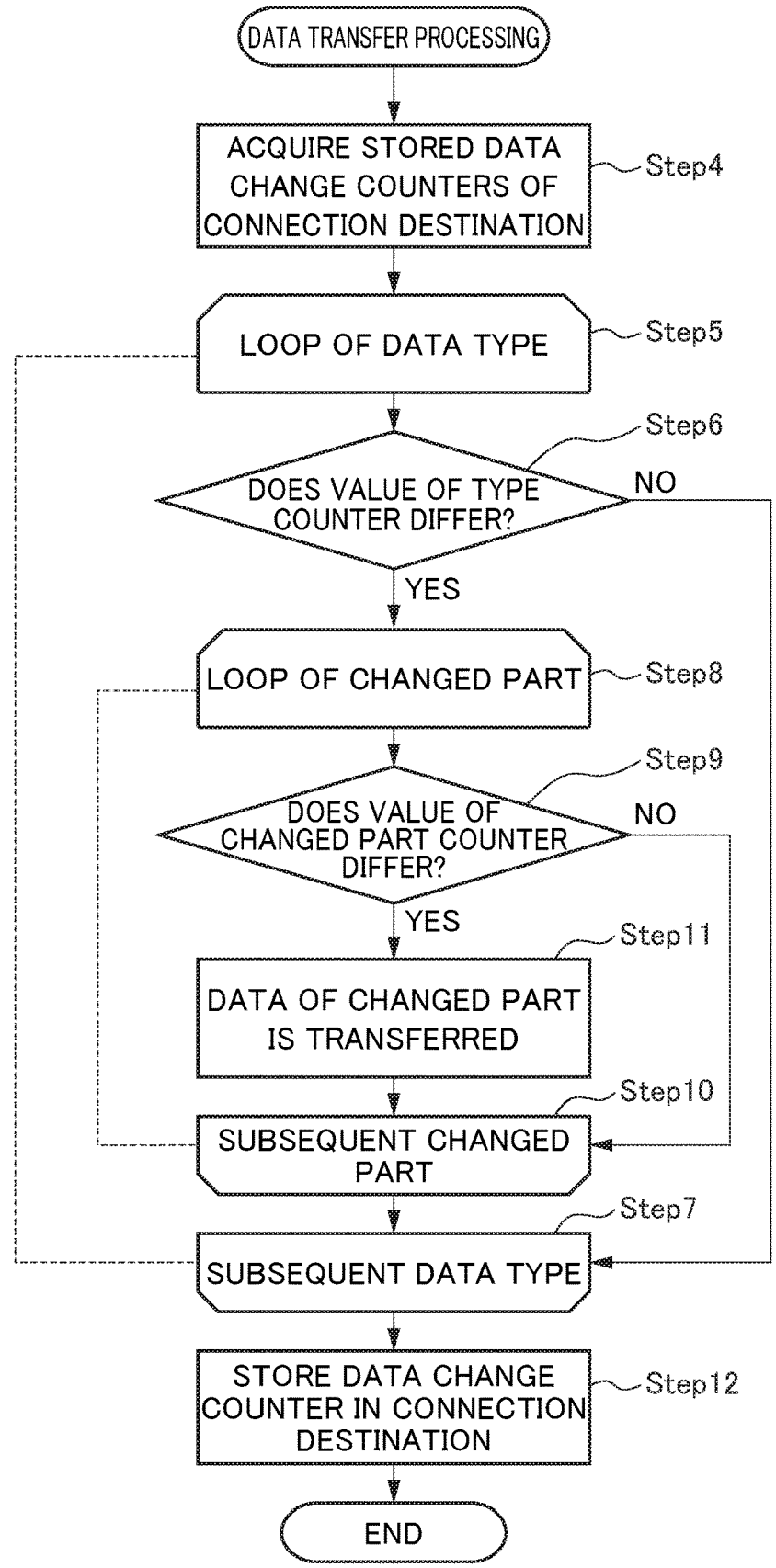
FIG. 10 is a flowchart showing the method of controlling the industrial machine according to the second embodiment of the present invention.

Further, when matching/equalizing the changed data on the CNC 1 side with the data on the PCs 2 side, as shown in FIGS. 7 and 10, the current "changed data identification list" 14 is read out from the changed data identification list storage unit 15 of the CNC 1 while the "changed data identification list" 14 before updating is read out from the pre-update counter storage unit 17 on each PCs 2 side, and a difference between the values of type counters each corresponding to the current "changed data identification list" 14 and the "changed data identification list" 14 before updating is obtained (comparing the counters: Step 5, Step 6). In other words, it is checked whether or not the values of each of the counters are different through comparison.

In the present embodiment, when the difference between the values of the type counters corresponding to each of the current "changed data identification list" 14 and the "changed data identification list" 14 before updating is obtained, if the difference is "0", it is found that the data in the region had not been changed. If the difference is "1", it is found that the data in the region had been changed once. If the difference is "2", it is found that the data in the region had been changed twice.

If the difference between the counters for each data type is "0", it is checked whether or not there is a difference between the counters of the subsequent data type (Step 7).

On the other hand, if the difference is "1 or more", it is checked whether or not a difference between the counters for each changed part of the regions 11a, 11b, 11c, 11d, 11e, . . . of the subordinate class 11 (the counters of the identifier storage unit 12 of each subdivision data type storage unit 11) is "1 or more" (Step 8, Step 9).

If the difference between the counters for each changed part is "0", it is checked whether or not the difference between the counters of the subsequent changed part in the same region (the identifier storage unit 12) is "1 or more" (Step 10).

If the difference between the counters for each changed part is "1 or more", the changed data of each changed part (the part corresponding to the subdivision data type storage unit 11) is transferred to the various data storage units 6 on the PCs 2 side (Step 11).

The checking of the counters of the changed parts and the checking of the counters of the data types are sequentially performed, and the operation described above is repeated.

If it is confirmed that a change was made due to the type counters being different, the data of the changed part of said data type is transferred, and then the pre-change "changed data identification list" 14 of the plurality of the PCs 2 is updated/rewritten and saved. It should be noted that, even when the counter was not changed, it is preferable to transfer data from the CNC 1 side and then to update/rewrite and save the pre-change "changed data identification list" 14 of the plurality of the PCs 2 once all the counter comparison operations are completed, in order leave a record of counter comparison.

If the operation described above is performed for all the data types, both sides of the CNC 1 as well as the plurality of PCs 2 will have the same changed data.

Hence, in the control system B of the industrial machine according to the present embodiment, by acquiring a set of current counters and comparing them with the stored counters before being changed, it becomes possible to easily distinguish the data type which was changed as well as the changed part.

Hence, in the control system B of the industrial machine according to the present embodiment, when, for example, it is desired to match/equalize the content information of various data between a CNC and a plurality of PCs or between a CNC and a plurality of CNCs or PCs, the data type which was changed can be automatically distinguished, and only the data region of such a type is transferred, thereby enabling reduction of the processing time. Accordingly, operability and hence productivity can be enhanced.

Also, since the data type which was changed can be presented/extracted, it becomes unnecessary to rely on memory or visual check when the operator selects the type of data to be transferred, with the result that the burden during the operation can be reduced.

Furthermore, since the changed part within the data can be automatically distinguished, it is possible to reduce the processing time for data transfer.

Although the second embodiment of the control system of the industrial machine according to the present invention has been described so far, the present invention is not limited to the second embodiment described above, and modifications including the modification examples of the first embodiment can be made as necessary as long as they do not depart from the spirit of the invention.

For example, the control system and the control method of the counter system type according to the present embodiment can also be applied to a case where changed data is transferred so as to be matched and equalized between one device and another device, as in the first embodiment. They may also be applied to a case where data is matched and equalized between a CNC and a plurality of CNCs or PCs.

EXPLANATION OF REFERENCE NUMERALS

1 CNC (present device)
2 PC (other device)
3 changed data identification list storage unit
4 various data storage unit (present-device-side data storage unit)
5 updated data processing unit
6 various data storage unit (other-device-side data storage unit)
7 operation execution unit
10 superordinate class
10a to 10c region of superordinate class
11 subordinate class
11a to 11e region of subordinate class
12 identifier storage unit
13 changed data identification list
14 changed data identification list
15 changed data identification list storage unit
16 updated data processing unit
17 pre-update counter storage unit
A control system of industrial machine
B control system of industrial machine

What is claimed is:

1. A control system of an industrial machine for matching data in a present device with data in one or more other devices, wherein the control system comprises:
a changed data identification list including: regions of a type data storage unit serving as a superordinate class of type data; regions of a subdivision data type storage unit serving as a subordinate class of the regions of the type data storage unit; a first identifier storage unit indicating a first identifier that corresponds to each of the regions of the type data storage unit and identifies whether or not data in the respective region of the type data storage unit has changed;
and a second identifier storage unit indicating a second identifier that corresponds to each of the regions of the subdivision data type storage unit and identifies whether or not data in the respective region of the subdivision data type storage unit has changed,
the present device comprises: a changed data identification list storage unit storing the changed data identification list; a present-device-side data storage unit storing various data; and an updated data processing unit, and
an other device comprises: an other-device-side data storage unit storing various data; and an operation execution unit using the various data to perform a desired operation,
the control system configured such that the updated data processing unit uses the first and the second identifiers in the changed data identification list to check whether or not the data in the respective region of the subdivision data type storage unit has changed, transfers only the changed data in the respective region of the subdivision data type storage unit to the other devices, and matches the data in the present device with the data in the other devices.

2. The control system of the industrial machine according to claim 1,
wherein, in the case of a one-to-one connection environment between the one present device and the one other device, a flag that identifies whether the data is in either an initial state or a changed state is used as each of the first and second identifiers.

3. The control system of the industrial machine according to claim 1,
wherein, in the case of a one-to-one or one-to-multiple connection environment between the one present device and the one other device or the other devices, a counter, which is incremented or decremented each time the data is changed and identifies an initial state of the data as well as a changed state in the number of changes in the data, is used as each of the first and second identifiers.

4. The control system of the industrial machine according to claim 2,
configured such that the flag is reset to the initial state when the data in the region which has changed is transferred to the other device.

5. The control system of the industrial machine according to claim 1, wherein the updated data processing unit is configured to:
use the first identifier to check whether or not the data in the respective region of the type data storage unit has changed;
use the second identifier to check whether or not the data in the respective region of the subdivision data type storage unit has changed only within the region of the type data storage unit that includes the changed data; and
transfer only the changed data in the respective region of the subdivision data type storage unit to the other device.

\* \* \* \* \*